(12) United States Patent
Lim

(10) Patent No.: US 11,121,946 B2
(45) Date of Patent: Sep. 14, 2021

(54) CAPTURING PACKETS IN A VIRTUAL SWITCH

(71) Applicant: Nicira, Inc., Palo Alto, CA (US)

(72) Inventor: Harold Vinson C. Lim, Union City, CA (US)

(73) Assignee: Nicira, Inc., Palo Alto, CA (US)

( * ) Notice: Subject to any disclaimer, the term of this patent is extended or adjusted under 35 U.S.C. 154(b) by 505 days.

(21) Appl. No.: 15/374,344

(22) Filed: Dec. 9, 2016

(65) Prior Publication Data

US 2018/0167287 A1    Jun. 14, 2018

(51) Int. Cl.
*H04L 12/26* (2006.01)
*H04L 12/931* (2013.01)
*H04L 12/713* (2013.01)
*H04L 12/741* (2013.01)

(52) U.S. Cl.
CPC ............ *H04L 43/026* (2013.01); *H04L 49/70* (2013.01); *H04L 45/586* (2013.01); *H04L 45/745* (2013.01)

(58) Field of Classification Search
None
See application file for complete search history.

(56) References Cited

U.S. PATENT DOCUMENTS

| 8,336,029 | B1 * | 12/2012 | McFadden | G06F 9/45516 717/100 |
| 2015/0172222 | A1 * | 6/2015 | Liao | H04L 49/356 370/392 |
| 2016/0021032 | A1 * | 1/2016 | Maier | H04L 49/70 370/401 |
| 2016/0105471 | A1 * | 4/2016 | Nunes | H04L 12/4633 709/228 |
| 2017/0093640 | A1 * | 3/2017 | Subramanian | H04L 41/12 |
| 2017/0272367 | A1 * | 9/2017 | Kozat | H04L 47/50 |
| 2018/0152519 | A1 * | 5/2018 | Agarwal | H04L 67/141 |

* cited by examiner

*Primary Examiner* — Jutai Kao

(57) ABSTRACT

Described herein are systems, methods, and software to capture packets of interest in a virtual switch. In one implementation, a method of capturing packets of interest in a virtual switch includes identifying a request to capture packets associated with first packet attributes. The method further includes, in response to the request, assigning a virtual port for forwarding the packets associated with the first packet attributes, and implementing a forwarding rule in the virtual switch to forward the packets associated with the first packet attributes to at least the virtual port. The method further provides for directing traffic over the virtual switch using the forwarding rule.

20 Claims, 7 Drawing Sheets

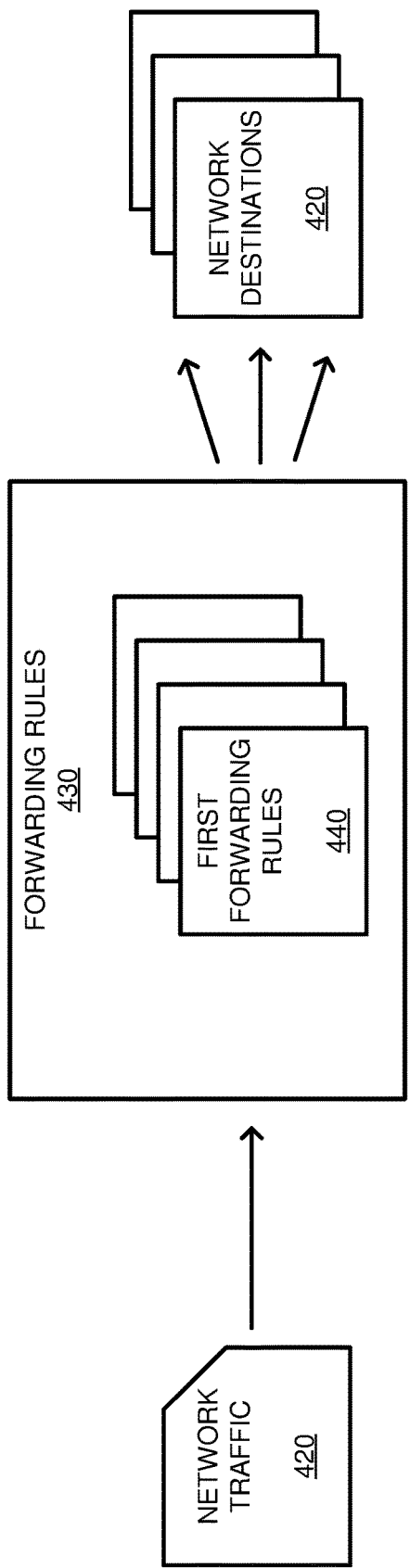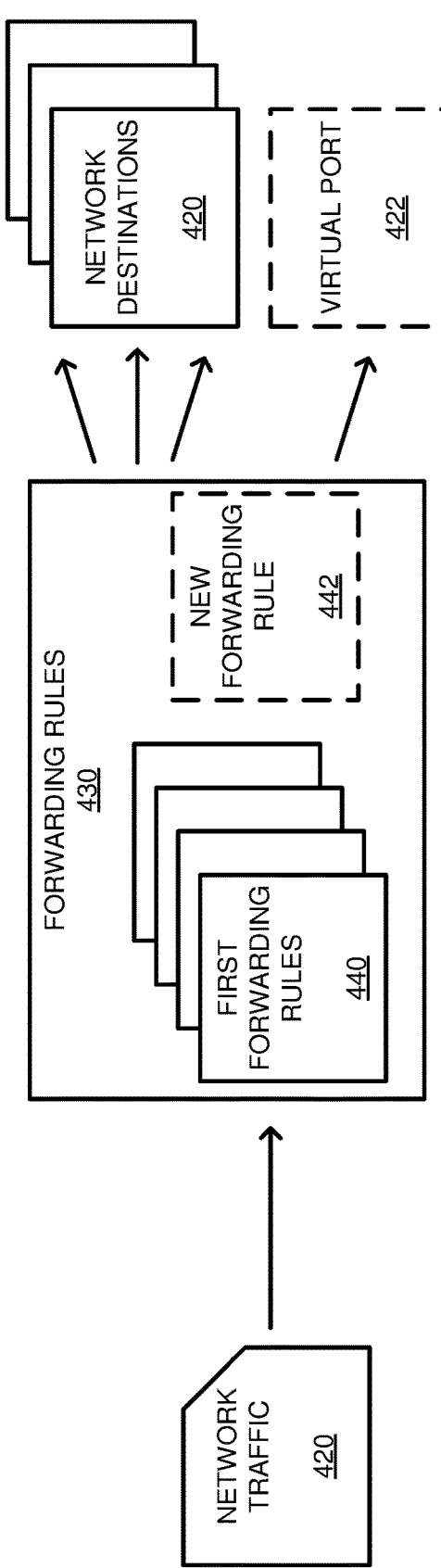
FIGURE 4A
FIGURE 4B

| RULES 610 | SOURCES 612 | DESTINATIONS 614 | PROTOCOLS 616 | ACTIONS 618 |
|---|---|---|---|---|
| RULE A 640 | SOURCE | DESTINATION | PROTOCOL | ACTION |
| RULE B 641 | SOURCE | DESTINATION | PROTOCOL | ACTION |
| RULE C 642 | SOURCE | DESTINATION | PROTOCOL | ACTION |
| RULE D 643 | SOURCE | DESTINATION | PROTOCOL | ACTION |

DATA STRUCTURE 600

CAPTURING PACKETS IN A VIRTUAL SWITCH

TECHNICAL BACKGROUND

In computing environments, virtual switches may be used that comprise software modules capable of providing a communication platform for one or more virtual nodes in the computing environment. These virtual switches may be used to intelligently direct communication on the network by inspecting packets before passing them to other nodes on the same network. For example, packets may be inspected to determine the source and destination internet protocol (IP) addresses to determine if the communication is permitted to be delivered to the destination computing node. In some implementations, virtual switches may be configured with forwarding rules or flow operations that indicate actions to be taken against a packet. These flow operations identify specific attributes, such as IP addresses, media access control (MAC) addresses, and the like, within the data packet and, when identified, provide a set of actions to be asserted against the data packet. These actions may include modifications to the data packet, and forwarding rules for the data packet, amongst other possible operations.

To manage the virtual switches, a virtual switch controller may be provided that is used to separate the control plane from the data plane of a software defined network. These virtual switch controllers are used to define rules, or control mechanisms that direct a packet when it is received by the virtual switch. In some implementations, this routing may include defining which nodes are associated with which networks, which security mechanisms are placed on communicating packets, or some other control mechanism with respect to the data plane of the virtual switch. However, although virtual switches and their associated controllers provide a valuable mechanism for routing packets for virtual machines, difficulties often arise when administrators attempt to monitor the packet communications over the virtual switch and software defined network.

OVERVIEW

The technology disclosed herein enhances packet capture in a virtual switch. In one implementation, a method of capturing packets of interest in a virtual switch includes identifying a request to capture packets associated with first packet attributes. The method further includes, in response to the request, assigning a virtual port for forwarding the packets associated with the first packet attributes, and implementing a forwarding rule in the virtual switch to forward the packets associated with the first packet attributes to at least the virtual port. The method further provides receiving a packet at the virtual switch, determining whether the packet qualifies to be forwarded to the virtual port based on the forwarding rule and, if the packet qualifies to be forwarded to the virtual port, forwarding the packet to at least the virtual port.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIGS. 4A-4B illustrate an overview of implementing forwarding rules to manage packet capture according to an implementation.

FIG. 6 illustrates a data structure for managing packet capture rules according to an implementation.

DETAILED DESCRIPTION

Figure 1:
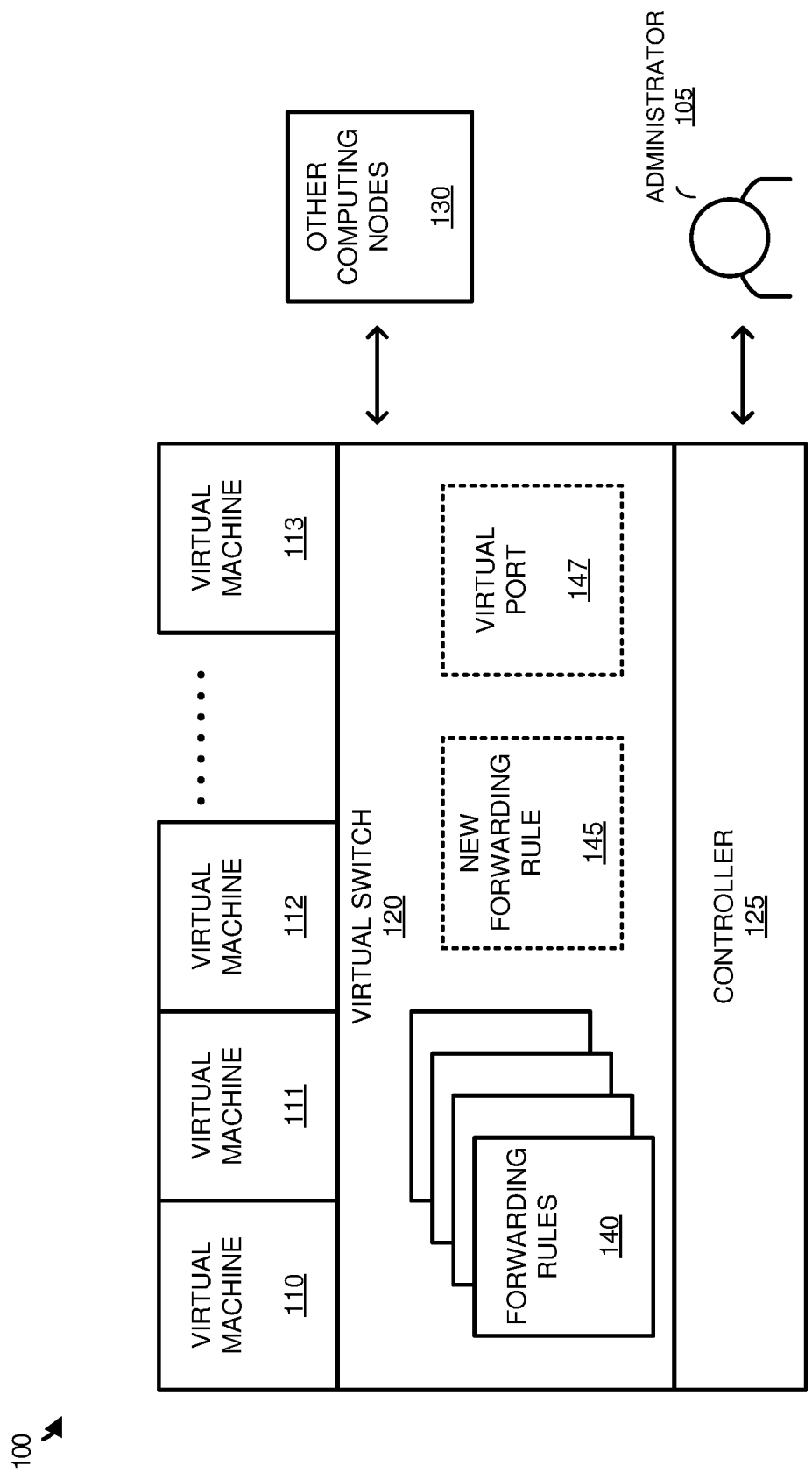
FIG. 1 illustrates a computing environment to manage packet monitoring in a virtual switch according to an implementation.

The various examples disclosed herein provide enhancements for managing packet monitoring in a virtual switch according to an implementation. In particular, virtual switches are configured with forwarding rules that indicate actions to be taken against packets as they are passed through the virtual switch. These forwarding rules may each define attributes, such as source and destination internet protocol (IP) addresses, source and destination media access control (MAC) addresses, protocols, and the like of packets associated with the rule, and further provide a set of actions to be asserted against data packets that include the specified attributes. These actions may include forwarding rules for the packet, modifications to the packet, firewall rules to block the packet, or some other similar rule. For example, a first packet received from a virtual machine may be inspected by the virtual switch to determine which forwarding rules apply for the packet. Accordingly, the virtual switch may identify attributes within the header of the communication and any other similar attributes of the communication, and compare the attributes to the defined rules. Once a rule is identified, the packet may be forwarded, blocked, and/or modified in accordance with the rule.

Here, in addition to the rules that are used in forwarding communications to their desired destinations of the network, monitoring or capturing rules may also be implemented by an administrator of the virtual switch to log and monitor packets with specific attributes. To implement a monitoring rule, an administrator may, via a controller for the virtual switch, define attributes of packets that should be captured. Based on the defined attributes, a virtual port may be assigned from the virtual switch to support the packet capture, and a rule added to the forwarding rules of the virtual switch to forward packets with the defined attributes to the virtual port. In one example, this virtual port will not be connected to a virtual machine or any other computing node, but rather may be used in the collection of packets that qualify for the defined attributes. In some implementations, the virtual port may be associated with or coupled to a log file, wherein each of the packets that qualify with the defined attributes may be stored in the log file. This log file may be coupled to the virtual port using a file path (filename, directory, storage drive name and the like), wherein packets provided to the virtual port are forwarded to the log file at the file path. In other implementations, the virtual port may be associated with a terminal screen, wherein an administrator may monitor, in near real-time, the packets that qualify for the defined attributes. Although these are some examples of capturing packets using a virtual port, it should be understood that an administrator may perform other operations with respect to packets qualifying for the virtual port.

In some implementations, in adding the new forwarding rule and the virtual port, the controller may be used to replace a current rule in the virtual switch with the new rule. For example, if a first rule existed to forward transmission control protocol (TCP) communications to a virtual machine operating on a host with the virtual switch, a second rule may be implemented that forwards the TCP communications to the virtual machine (using a virtual port assigned to the virtual machine), as well as a virtual port designated for capturing packets. Thus, in addition to forwarding the packets to the virtual machine, an administrator may be able to transparently monitor the packets that are being forwarded to the virtual machine.

Once an administrator has collected the desired data from a capture rule, the administrator may also provide a selection to remove the rule. In such an instance, the capturing rule may be removed or replaced, and the port deallocated in the virtual switch. Thus, packets may no longer be forwarded to the virtual port assigned to the capture rule, and the port may be allocated to other virtual machines logically coupled to the virtual switch. In some examples, once a rule is defined for a virtual switch, a toggle may be provided via a user interface to the administrator of the host and/or virtual switch. This toggle, or some other similar user interface element, may permit the administrator of the host and/or virtual switch to dynamically implement and remove the rule as desired for monitoring packet flows within the computing environment.

Although described in the present example as assigning a single port to each of the rules, it should be understood that a rule may forward packets that qualify for the rule to multiple ports in some examples. Additionally, while demonstrated in the previous example as allocating an individual port to each of the rules, it should be understood that multiple rules may be assigned and forward packets to the same port. For example, when a first capture rule is generated, two ports may be allocated for capturing packets that meet attributes associated with the first capture rule. Further, when a second capture rule is implemented to support a second set of packet attributes, the second capture rule may be allocated at least one shared virtual port with the first capture rule. As a result, when packets qualify for either the first capture rule or the second capture rule, the packets will be forwarded to at least the shared virtual port.

FIG. 1 illustrates a computing environment 100 to manage packet monitoring in a virtual switch according to an implementation. Computing environment 100 includes virtual machines 110-113, virtual switch 120, controller 125, administrator 105, and other computing nodes 130. Virtual machines 110-113, virtual switch 120, and controller 125 operate on a host computing system, wherein the host computing system may comprise a serving computing system, a desktop computing system, a laptop computing system, or some other similar host computing element. Other computing nodes 130 may comprise virtual and physical computing systems that communicate with virtual machines 110-113 using virtual switch 120 and a physical network interface for the host computing system of virtual machines 110-113. Administrator 105 may interact with the host computing system directly using a user interface for the host computing system, or may interact using an administration console device for the host computing system.

In operation, virtual machines 110-113 are deployed on a host computing system to more efficiently utilize the processing resources of the host computing systems. To provide connectivity for the virtual machines, virtual switch 120 is provided, which is used to intelligently direct communications for virtual machines 110-113 by inspecting the packets before passing the packets to other physical or virtual nodes. To provide the inspection operations, virtual switch 120 is configured with forwarding rules 140, which in some examples may include one or more flow tables or flow operations, wherein the rules identify attributes within the packet communications, and based on the attributes, implement actions for the packets. These actions may include forwarding actions, blocking actions, modifying actions, or any other similar action on an identified packet. For example, if virtual machine 110 transferred a Hypertext Transfer Protocol (HTTP) packet to a destination computing node in other computing nodes 130, virtual switch 120 would identify the packet, apply forwarding rules 140, and determine an action to be taken corresponding to the packet based on the attributes associated with the packet.

In addition to the virtual switch, the host computing system further includes controller 125, which is used to separate the control plane from the data plane of the virtual switch. In particular, controller 125 may be used to define the rules, or control mechanisms that direct packets as they are identified by virtual switch 120. Thus, based on the routing and switching requirements for each of the virtual nodes, controller 125 may define virtual switches, virtual local area networks, virtual routers, and other similar information for virtual switch 120. In some implementations, at least a portion of the rules may be defined by a local administrator for virtual switch 120 and controller 125. However, in other examples, at least a portion of the rules may be defined by a central controller that can be used to configure the data plane across a plurality of hosts in a computing environment.

Here, in addition to the forwarding rules provided for processing communications between virtual machines 110-113 and other computing nodes 130, an administrator 105 may further generate requests for rules that can be used for packet capture. These rules may define one or more attributes of packets, such as source and destination addresses, protocols, time of communication, and the like, and forward the packets to a virtual port for monitoring the data packets, wherein the virtual port may be coupled to a log file or a console capable of viewing the traffic with the defined attributes. This generation of capture rules permits an administrator to dynamically add an artificial destination for packets of interest while maintaining previously existing forwarding operations of the virtual switch.

Although described in the previous example as allocating a single virtual port to a capture rule, it should be understood that any number of virtual ports may be allocated for capturing packets. Further, in some implementations, rather than being allocated to a single capture rule, a virtual port may be allocated to multiple capture rules. For example, an administrator may desire that two capture rules be forwarded to the same virtual port, wherein the virtual port may correspond to a log file for capturing packets associated with each of the rules.

Figure 2:
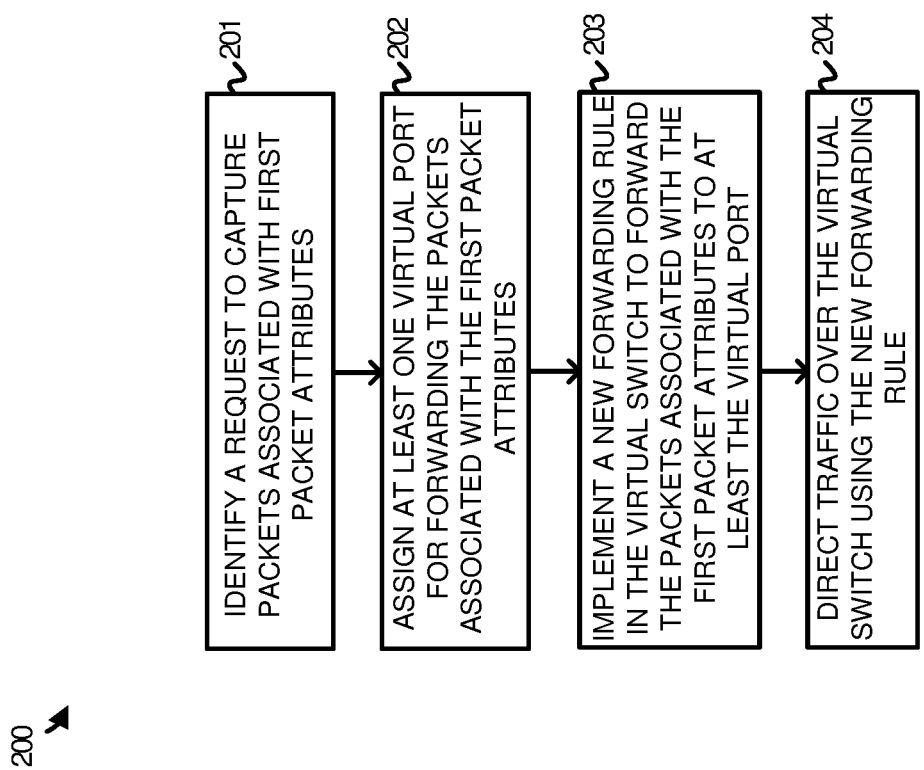
FIG. 2 illustrates a method of managing packet capture in a virtual switch according to an implementation.

To further demonstrate the operations of computing environment 100, FIG. 2 is provided. FIG. 2 illustrates a method 200 of managing packet capture in a virtual switch according to an implementation. The operations of FIG. 2 are referenced parenthetically in the paragraphs that follow, along with references to the elements and systems from computing environment 100 of FIG. 1.

As depicted, method 200 includes identifying (201) a request to capture packets associated with first packet attributes. In some implementations, this request may be received via a user interface on the host computing system from administrator 105. In other examples, the request may be received via a communication interface from an administration console associated with administrator 105, or a central controller for a plurality of host computing systems. This request may specify various desired attributes for the captured packets, such as one or more destination IP addresses, one or more source IP addresses, one or more source MAC addresses, one or more destination MAC addresses, one or more ports, one or more services/protocols, or some other similar attribute for a packet.

In response to receiving the request, controller 125 on the host computing system may assign (202) at least one virtual port (in the present example virtual port 147) for forwarding the packets associated with the first packet attributes. This virtual port, which is not associated with a virtual node or virtual machine, may be linked to a log file (using a file path, directory name, drive name, and the like), a console readout, or some other similar operation to monitor the packets that meet the desired packet attributes. Accordingly, similar to forwarding the packet to a virtual machine of virtual machines 110-113 that are each assigned at least one virtual port, virtual switch 120 may forward the packet to virtual port 147.

In addition to assigning the virtual port for forwarding packets with the desired attributes, controller 125 will also implement (203) a new forwarding rule 145 in virtual switch 120 to forward the packets associated with the first packet attributes to virtual port 147. This rule may include the defined attributes from administrator 105, as well as an action to forward packets with the defined attributes to at least virtual port 147. In some implementations, new forwarding rule 145 may replace a forwarding rule of forwarding rules 140 or may modify an existing rule in forwarding rules 140. For example, the forwarding rule may maintain current forwarding operations to and from virtual machines 110-113 and other computing nodes 130, but may add a new action to forward the packet to virtual port 147. Thus, if a forwarding rule forwarded TCP packets to virtual machine 110, then the new forwarding rule may forward the same TCP packets to virtual machine 110 and further forward the packets to virtual port 147. In other implementations, rather than replacing a current forwarding rule in forwarding rules 140, a new rule may be added to the set of forwarding rules 140. This new rule, in some examples, may be provided with a higher priority than other rules to ensure that packets associated with the defined criteria from administrator 105 are captured and the rule is applied.

Once new forwarding rule 145 and virtual port 147 are implemented in virtual switch 120, the method further provides for directing (204) traffic over the virtual switch using the new forwarding rule. In particular, as packets are identified from the physical network interface directed to one of virtual machines 110-113 or identified as transferred from virtual machines 110-113, the packets may be inspected and compared against new forwarding rule 145 and forwarding rules 140. When a match is identified for a particular rule, a forwarding action may be taken against the packet as defined for the rule. Thus, when a packet matches attributes for new forwarding rule 145, the packet may be forwarded to at least virtual port 147, and further forwarded to other virtual or physical computing systems.

Figure 3:
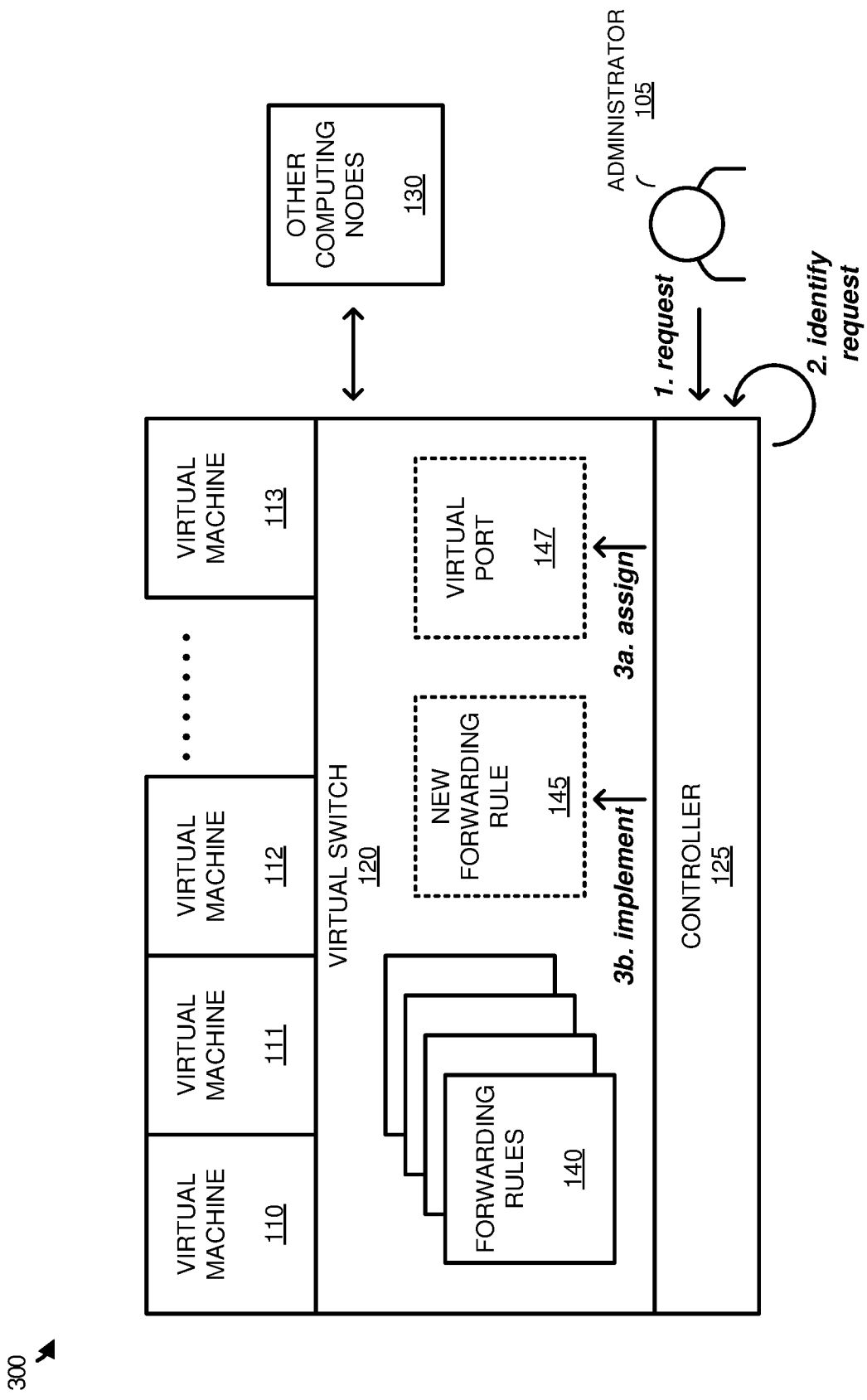
FIG. 3 illustrates an operational scenario of managing packet capture in a virtual switch according to an implementation.

FIG. 3 illustrates an operational scenario 300 of managing packet capture in a virtual switch according to an implementation. Operational scenario 300 is illustrated using systems and elements of computing environment 100 of FIG. 1.

As depicted in FIG. 3, an administrator may, at step 1, generate a request to implement a new packet capture rule for the host associated with virtual machines 110-113, virtual switch 120, and controller 125. This request may be generated locally at the host computing system, may be generated using a console device communicatively coupled to the host computing system, may be provided via a master controller for the computing environment, or may be defined in any other similar manner. Once the request is defined, the controller may identify, at step 2, attributes associated with the request, and assign, at step 3a, virtual port 147 to support the request and implement, at step 3b, new forwarding rule 145 in virtual switch 120. In particular, new forwarding rule 145 may be used to forward packets associated with the defined attributes from administrator 105 to at least virtual port 147. Although illustrated in a particular order in the present example, it should be understood that steps 3a and 3b may occur simultaneously or in the opposite order.

In some implementations, when implementing new forwarding rule 145, controller 125 may replace an existing rule in forwarding rules 140. For example, if the user desired to monitor traffic between two virtual machines of virtual machines 110-113, the rule may replace a rule that routes traffic between the virtual machines, wherein the rule may continue the forwarding of traffic between the machines while also forwarding the packets to virtual port 147. In some examples, virtual port 147 may be mapped to a console wherein administrator 105 may monitor packets with the defined attributes in real-time. In other examples, in addition to or in place of the console, virtual port 147 may be mapped to a log file, wherein the log file may maintain information about each communication that triggers the forwarding rule. This log file may then be opened, viewed, and in some instances searched by administrator 105 to identify particular communications.

Once a new forwarding rule is implemented in virtual switch 120, administrator 105 may dynamically allocate and deallocate the rule as required. Referring to the example in FIG. 3, once a rule is created and implemented, administrator 105 may determine that the rule is no longer required and provide a request to remove new forwarding rule 145. In response to the request, the rule may be removed from virtual switch 120, and virtual port 147 deallocated for use in capturing packets associated with the rule. In some examples, to assert and remove new forwarding rule a toggle or some other interface may be provided to administrator 105 once the rule is defined. As a result, either locally on the host computing system, or remotely via a console device, the administrator may activate or deactivate the new forwarding rule using a slider, a toggle, or some other interface to dynamically implement and remove the rule. This adding and removing of the rule may include replacing rules of virtual switch 120 to reflect the use of a virtual port for capturing packets.

While demonstrated in the examples of FIGS. 1-3 as allocating or assigning a single virtual port for the capture rule, it should be understood that multiple ports may be used in the capture of packets. For example, in addition to assigning virtual port 147 for the capture of packets associated with new forwarding rule 145, one or more additional ports may also capture packets associated with new forwarding rule 145. Further, while a single rule is associated with virtual port 147 in the examples of FIGS. 1-3, it should be understood that multiple capture rules may be allocated to virtual port 147. Accordingly, in addition to new forwarding rule 145, a second capture forwarding rule may be implemented in virtual switch 120 that forwards packets to virtual port 147 for capture.

FIGS. 4A and 4B illustrate an overview of implementing forwarding rules to manage packet capture according to an implementation. FIGS. 4A and 4B include network traffic 420, forwarding rules 430, and network destinations 420. FIG. 4A includes first forwarding rules 440, which are used to inspect the packets and intelligently direct the packets to one or more network destinations. FIG. 4B includes first forwarding rules 440 and new forwarding rule 442, wherein the rules are used to inspect the packets from network traffic 420 and intelligently direct the packets to one or more network destinations in network destinations 420 or virtual port 422.

Referring first to FIG. 4A, FIG. 4A is representative of a virtual switch implementation without a packet capture rule. In particular, a virtual switch may receive network traffic 420 from an external computing system or a local virtual node (such as a virtual machine). In response to receiving the network traffic, the virtual switch may apply forwarding rules 430 to determine how the packet should be forwarded. These rules may be used to block specific packets in the network traffic, modify specific packets in the network traffic, or forward the packets to a corresponding network destination. For example, a communication from the internet may be received by the virtual switch, from the physical network interface, and may be inspected by first forwarding rules 440. Based on the inspection the communication may be forwarded to a virtual machine operating on the host computing system with the virtual switch.

Turning to FIG. 4B, during the operation of the virtual switch, an administrator may desire to monitor packets and network traffic that include specific attributes. To provide this monitoring and packet capture, the administrator may define attributes of packets that are of interest to the administrator. Once the attributes are identified, a new forwarding rule 442 may be added to forwarding rules 430, and a new virtual port 422 generated to support the capture of the packets. This new forwarding rule 442 may be used to identify packets with the attributes of interest and forward the packets to virtual port 422. Accordingly, as network traffic 420 is received by the virtual switch, the virtual switch may apply forwarding rule 430 to intelligently direct the traffic to corresponding network destinations. Here, because new forwarding rule 442 is implemented, any packet that includes attributes that match new forwarding rule 442 will be forwarded to at least virtual port 422.

In some implementations, when new forwarding rule 442 is added to forwarding rules 430, the rule may replace a rule that was previously implemented for the virtual switch. For example, if a rule managed the forwarding of internet traffic to a virtual machine of a host computing system, the rule may be replaced with a rule that maintains the previous operations (such as forwarding all internet traffic to the virtual machine), while additionally forwarding the traffic to virtual port 422. Accordingly, without affecting the operation of the virtual switch, packets with desired attributes may be captured using virtual port 422.

Although illustrated in the present example as adding a new forwarding rule to a virtual switch, it should be understood that administrators may further provide requests to remove packet capture rules. In at least one implementation, when an administrator desires to cease the collection of packets associated with particular attributes, the administrator may provide a request, and new forwarding rule 442 may be removed from forwarding rules 430. In some examples, this removal may include implementing a new rule that forwards packets to network destinations without using virtual port 422. Further, once the request is received, the virtual port may be unassigned from capturing packets, and assigned to new operations or virtual machines for the virtual switch.

Figure 5:
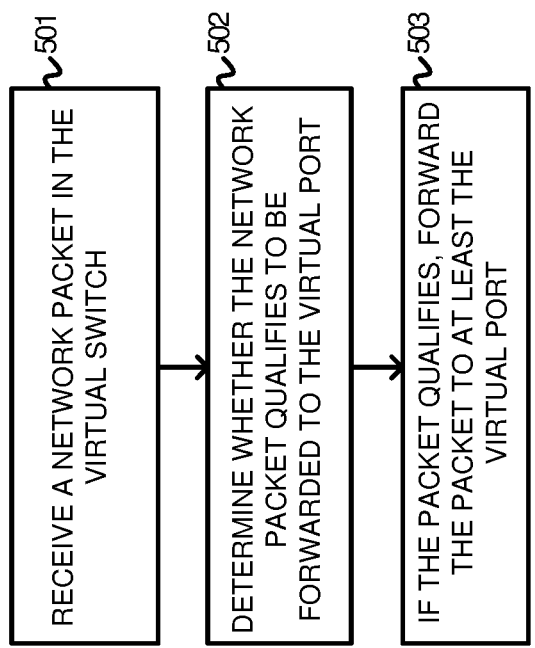
FIG. 5 illustrates a method of managing packet capture in a virtual switch according to an implementation.

FIG. 5 illustrates a method of managing packet capture in a virtual switch according to an implementation. The operations of FIG. 5 are represented parenthetically in the paragraphs that follow. As described herein an administrator may provide a packet capture request, wherein the packet capture defines attributes of packets desired to be captured. In response to the request, a new forwarding rule may be implemented in the virtual switch, and a virtual port may be assigned to collect the desired packets. In some implementations, in adding the forwarding rule, the forwarding rule may replace at least one preexisting rule and/or place the capture rule at a higher priority than other rules in the virtual switch to ensure the desired packets are at least forwarded to the assigned virtual port. In some examples, each of the rules that are implemented within a virtual switch may be assigned a priority value, which ensures that certain rules are enforced before other rules on the same switch. Consequently, by providing the capture rule with a high priority value, a controller may ensure that the packets are at least forwarded to the virtual port associated with the capture attributes, while additional forwarding rules may be used to forward the packets to additional computing nodes and virtual machines.

Here, once the rule is implemented and the virtual port assigned, the virtual switch may receive (501) a network packet at the virtual switch. This packet may be received from a virtual machine on the host with the virtual switch, or may be received from a physical network interface of the host computing system. Once received, the virtual switch may inspect the packet and apply the various rules deployed in the virtual switch. In particular, the virtual switch may determine (502) whether the network packet qualifies to be forwarded to the assigned virtual port and, if the packet qualifies, forward (503) the packet to at least the virtual port.

For example, an administrator may desire to identify all database communications being received at a particular virtual machine. As a result, the administrator may define attributes, such as an identifier for the virtual machine, a source of the data, a service or communication protocol (database) associated with the data, or any other similar attributes for desired packets. Once defined, a rule may be implemented that inspects the packets as they are received in the virtual switch and forwards the packets to at least the virtual port used for packet capture. Accordingly, referring to the database example above, any database packets identified for the particular virtual machine may be forwarded to the virtual port, and may further be forwarded to the virtual machine itself. Consequently, the packet capture may be transparent to the operations of the network, as the communications are forwarded to a new virtual port of the virtual switch.

FIG. 6 illustrates a data structure 600 for managing packet capture rules according to an implementation. Data structure

600 is an example table that can be used for managing administrator defined capture rules. Although illustrated as a single table in the present implementation, it should be understood that any number of tables, trees, linked lists, arrays, or any other similar data structure may be used for data capture rules. Data structure 600 includes rules 610, sources, 612, destinations 614, protocol 616, and actions 618. While illustrated with four rules A-D 640-643 in the present implementation, it should be understood that data structure 600 may be used to store any number of rules.

As described herein, virtual switches are used to provide a communication platform for one or more virtual nodes of a computing environment. To provide this operation, the virtual switches may employ forwarding rules that inspect packets for various attributes, and forward the packets based on these attributes. To monitor the various communications within a software defined network with virtual switches, an administrator may generate a request to capture packets that meet specific administrator defined attributes. These attributes may include a source address for a communication, a destination address for a communication, a protocol associated with the communication, a time of the communication, or some other similar attribute. Once defined, a packet capture forwarding rule may be generated and implemented in the virtual switch to capture packets using an allocated virtual port.

In the present example, once a rule is generated, the rule may be stored in data structure 600, wherein the data structure may be used to store the generated rules to implement the rules as required. Here, the rules include sources 612, destinations 614, protocols 616, and actions 618, however it should be understood that rules may include fewer or greater matching attribute fields. As an illustrative example, once rule A 640 is generated and stored in data structure 600, an administrator may dynamically apply and remove the rule from a virtual switch. Accordingly, when applied based on a request from the administrator, the rule may be added (and in some cases used to replace a current rule) in the virtual switch. Further, a virtual port may be allocated for the rule, wherein the action in actions 618 may be used to forward an identified packet to at least the allocated virtual port.

In some implementations, once a rule is generated by an administrator, the rule may be applied without causing an effect on the rules currently implemented within the virtual switch. To provide this operation, when a rule is implemented it may be combined or used to replace an existing rule. For example, if a packet from a web source using HTTP protocol is configured to be forwarded to a first virtual machine. A packet capture rule, such as rule A, may be added to the virtual switch such that the HTTP protocol packet may be forwarded to the first virtual machine and a virtual port assigned for packet capture.

Figure 7:
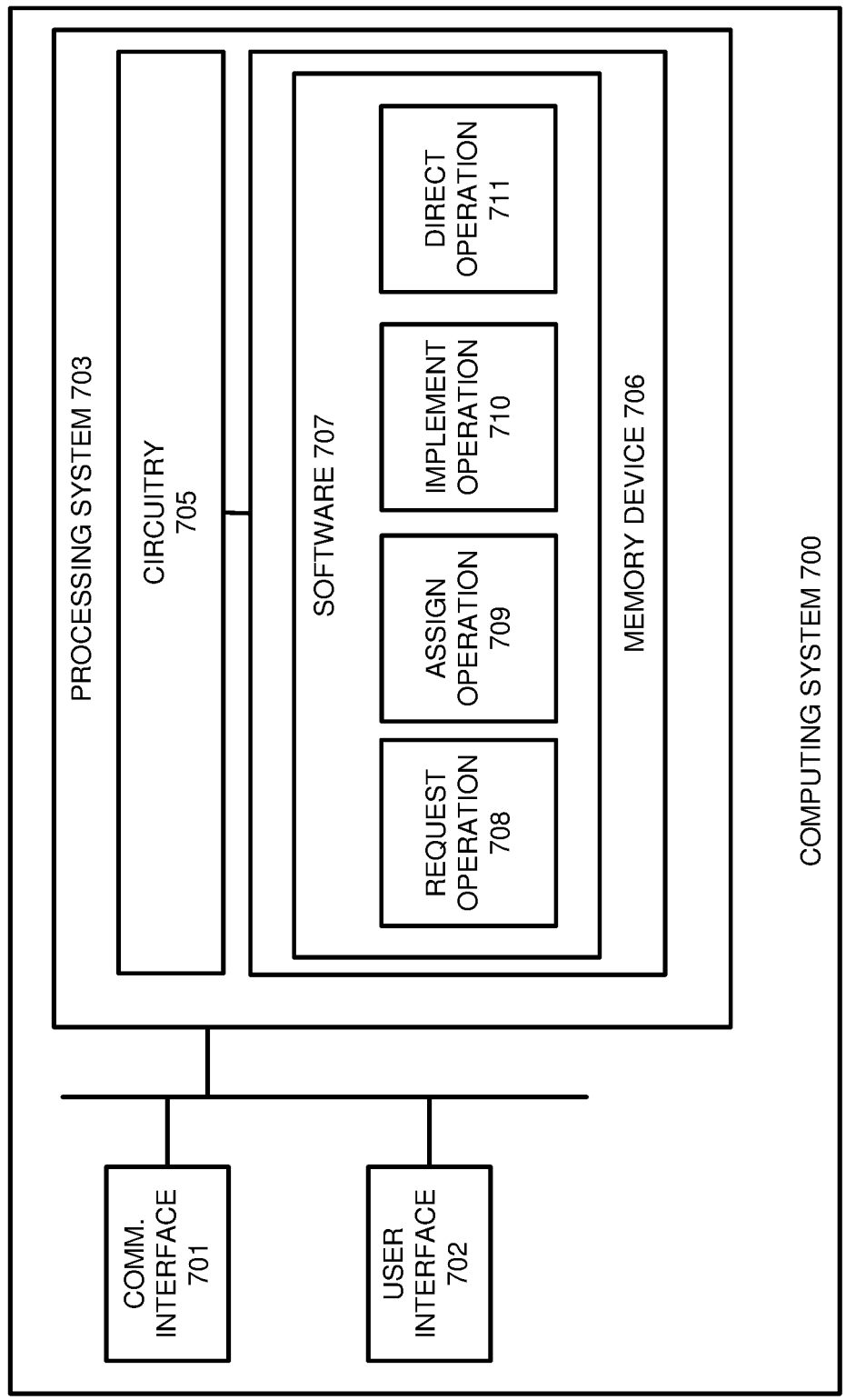
FIG. 7 illustrates a computing system to manage packet monitoring in a virtual switch according to an implementation.

FIG. 7 illustrates a computing system to manage packet monitoring in a virtual switch according to an implementation. Computing system 700 is representative of any computing system or systems with which the various operational architectures, processes, scenarios, and sequences disclosed herein for a host computing system can be implemented. Computing system 700 is an example of a host from FIGS. 1-6, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as a battery and enclosure that are not shown for clarity.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format-including combinations thereof.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus-including combinations thereof. User interface 702 may be omitted in some examples.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device, but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes request operation 708, assign operation 709, implement operation 710, and direct operation 711, although any number of software operations may provide a similar operation. Software operations 708-711 may operate in a virtualization platform, such as a hypervisor in some examples capable of providing a virtual switch and a virtual switch controller. Operating software 707 may further include an operating system, utilities, drivers, network interfaces, applications, or some other type of software. When executed by processing circuitry 705, operating software 707 directs processing system 703 to operate computing system 700 as described herein.

In at least one implementation, request operation 708 directs processing system 703 to monitor for a request to capture packets with administrator defined attributes. These attributes may include a source of a communication, a destination of a communication, the type of service of the communication, a time (hour, day, and the like) of the communication, or any other similar attribute for a communication. The request may be provided locally, via user interface 702 of computing system 700, or may be provided via a remote console or remote management system. In response to the request, assign operation 709 directs processing system 703 to assign a virtual port for forwarding the packets associated with the requested packet attributes. In some implementations, this virtual port may comprise a port for a virtual switch provided by computing system 700, wherein instead of being connected to a virtual network interface card (VNIC) of a virtual machine, the port may be coupled to a log file or console for monitoring the traffic with the defined attributes. In addition to assigning the port for the packet capture operations, implement operation 710 further directs processing system 703 to implement a new forwarding rule in the virtual switch to forward the packets associated with the first packet attributes to at least the virtual port. This rule may be used to identify attributes for packets passing through a virtual switch, and determine whether the attributes match the desired attributes specified by the administrator.

In some implementations, implement operation 710 may be used to replace or modify a current forwarding rule with a new rule that forwards packets to at least the allocated virtual port. For example, if an existing forwarding rule forwarded traffic from a first virtual machine to a second virtual machine, a new forwarding rule may be provided that maintains the forwarding between the virtual machines, and adds forwarding to the newly assigned virtual port for data capture. Thus, the capture of packets in computing system 700 may be transparent, while maintaining the operations on the virtual switch.

After the virtual port is allocated and the new rule is implemented in the virtual switch, direct operation 711 directs processing system 703 to direct traffic on the virtual switch using the new forwarding rule. In particular, for each packet identified at the virtual switch, which may be received from a virtual machine coupled to the virtual switch or from physical communication interface 701, direct operation 711 may identify attributes of the packet, determine whether the new forwarding rule applies to the packet and, if the new forwarding rule applies, forward the packet to at least the virtual port assigned to capture packets with the attributes.

In some implementations, when a new rule is generated for packet capture, the administrator may toggle or turn on/off the new rule as required. For example, once the capture has executed for a required period for the administrator, the administrator may provide a second request to remove the capture rule. In response to the second request, software 707 may remove the new forwarding rule for the packet capture and deallocate the virtual port that was used for the capture of packets. In some instances, in removing the new forwarding rule, computing system 700 may be required to replace the new forwarding rule with a rule that no longer forwards packets to the virtual port for packet capture. Referring to the example of forwarding packets between virtual machines on computing system 700, the previous rule may be reinstated that only directs traffic between the virtual machines, or may be replaced with a new rule that handles the communication between the virtual machines.

Although demonstrated in the example of FIG. 7 as allocating a single port to the capture rule, it should be understood that multiple ports may each capture packets that qualify for the capture rule.

Returning to the elements of computing environment 100 of FIG. 1, virtual machines 110-113, virtual switch 120, and controller 125 execute on a host computing system. The host computing system may, comprise communication interfaces and network interfaces, processing systems, computer systems, microprocessors, storage systems, storage media, or some other processing devices or software systems, and can be distributed among multiple devices. The host computing system may include software such as an operating system, logs, databases, utilities, drivers, natural language processing software, networking software, and other software stored on a computer-readable medium. The host computing system may comprise a server computing system, a desktop computing system, or some other similar computing system.

Other computing nodes 130 may be representative of serving computing systems, desktop computing systems, routers, or some other computing or networking node. Other computing nodes 130 may each comprise communication interfaces and network interfaces, processing systems, computer systems, microprocessors, storage systems, storage media, or some other processing devices or software systems, and can be distributed among multiple devices. Other computing nodes 130 may each include software such as an operating system, logs, databases, utilities, drivers, natural language processing software, networking software, and other software stored on a computer-readable medium.

Communication between the host computing system and other computing nodes 130 may use metal, glass, optical, air, space, or some other material as the transport media. Communication between the host computing system and other computing nodes 130 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between the host computing system and other computing nodes 130 may be a direct link or can include intermediate networks, systems, or devices, and can include a logical network link transported over multiple physical links The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of capturing packets of interest in a virtual switch, the method comprising:
   identifying a request to capture packets associated with first packet attributes;
   assigning one or more virtual ports of the virtual switch to capture the packets associated with the first packet attributes, wherein packets received by at least one virtual port of the one or more virtual ports are stored in a log file linked to the virtual port;
   in response to the request to capture packets associated with the first packet attributes, implementing a forwarding rule in the virtual switch to forward the packets associated with the first packet attributes to at least the one or more virtual ports, wherein the forwarding rule is allocated a higher priority value than one or more other forwarding rules associated with the first packet attributes;

receiving a packet at the virtual switch;

determining whether the packet qualifies to be forwarded to the one or more virtual ports based on the forwarding rule; and if the packet qualifies to be forwarded to the one or more virtual ports, forwarding the packet to at least the one or more virtual ports.

2. The method of claim 1 wherein identifying the request to capture packets associated with the first packet attributes comprises identifying an administrator request to capture packets associated with the first packet attributes.

3. The method of claim 1 wherein receiving the packet at the virtual switch comprises receiving the packet from a virtual machine coupled to the virtual switch.

4. The method of claim 1 wherein receiving the packet at the virtual switch comprises receiving the packet from a physical network interface of a host computing system for the virtual switch.

5. The method of claim 1 wherein the first packet attributes comprise at least one of a source address for a communication, a destination address for a communication, a protocol associated with the communication, or a time of the communication.

6. The method of claim 1 wherein implementing the forwarding rule comprises replacing a first forwarding rule in the virtual switch with a new forwarding rule in the virtual switch to forward packets associated with the first packet attributes to at least the one or more virtual ports.

7. The method of claim 1 wherein the one or more other forwarding rules forward the packet to one or more computing nodes.

8. The method of claim 1 wherein assigning the one or more virtual ports to capture the packets associated with the first packet attributes comprises assigning the one or more virtual ports to capture the packets associated with the first packet attributes, wherein packets received by at least one of the one or more virtual ports are displayed on a console.

9. A computer apparatus comprising:
one or more computer readable storage media;
processing circuitry operatively coupled with the one or more computer readable storage media; and
program instructions stored on the one or more computer readable storage media to capture packets of interest in a virtual switch that, when read and executed by the processing circuitry, direct the processing circuitry to at least:
identify a request to capture packets associated with first packet attributes;
assign one or more virtual ports of the virtual switch to capture the packets associated with the first packet attributes, wherein packets received by at least one virtual port of the one or more virtual ports are stored in a log file linked to the virtual port;
in response to the request to capture packets associated with the first packet attributes, implement a forwarding rule in the virtual switch to forward the packets associated with the first packet attributes to at least the one or more virtual ports, wherein the forwarding rule is allocated a higher priority value than one or more other forwarding rules associated with the first packet attributes;
receive a packet at the virtual switch;
determine whether the packet qualifies to be forwarded to the one or more virtual ports based on the forwarding rule; and
if the packet qualifies to be forwarded to the one or more virtual ports, forward the packet to at least the one or more virtual ports.

10. The computer apparatus of claim 9 wherein the program instructions to identify the request to capture packets associated with the first packet attributes direct the processing circuitry to identify an administrator request to capture packets associated with the first packet attributes.

11. The computer apparatus of claim 9 wherein the program instructions to receive the packet at the virtual switch direct the processing circuitry to receive the packet from a virtual machine coupled to the virtual switch.

12. The computer apparatus of claim 9 wherein the program instructions to receive the packet at the virtual switch direct the processing circuitry to receive the packet from a physical network interface of a host computing system for the virtual switch.

13. The computer apparatus of claim 9 wherein the first packet attributes comprise at least one of a source address for a communication, a destination address for a communication, a protocol associated with the communication, or a time of the communication.

14. The computer apparatus of claim 9 wherein the program instructions to implement the forwarding rule direct the processing circuitry to replace a first forwarding rule in the virtual switch with a new forwarding rule in the virtual switch to forward packets associated with the first packet attributes to at least the one or more virtual ports.

15. The computer apparatus of claim 9 wherein the one or more other forwarding rules forward the packet to one or more computing nodes.

16. The computer apparatus of claim 9 wherein the program instructions to assign the one or more virtual ports to capture the packets associated with the first packet attributes direct the processing circuitry to assign the one or more virtual ports to capture the packets associated with the first packet attributes, wherein packets received by at least one of the one or more virtual ports are displayed on a console.

17. An apparatus comprising:
one or more computer readable storage media;
program instructions stored on the one or more computer readable storage media to capture packets of interest in a virtual switch that, when read and executed by processing circuitry, direct the processing circuitry to at least:
identify a request to capture packets associated with first packet attributes;
assign one or more virtual ports of the virtual switch to capture the packets associated with the first packet attributes, wherein packets received by at least one virtual port of the one or more virtual ports are stored in a log file linked to the virtual port;
in response to the request to capture packets associated with the first packet attributes, implement a forwarding rule in the virtual switch to forward the packets associated with the first packet attributes to at least the one or more virtual ports, wherein the forwarding rule is allocated a higher priority value than one or more other forwarding rules associated with the first packet attributes;
receive a packet at the virtual switch;

determine whether the packet qualifies to be forwarded to the one or more virtual ports based on the forwarding rule; and if the packet qualifies to be forwarded to the one or more virtual ports, forward the packet to at least the one or more virtual ports.

18. The apparatus of claim 17 wherein the program instructions to receive the packet at the virtual switch direct the processing circuitry to receive the packet from a virtual machine coupled to the virtual switch.

19. The apparatus of claim 17 wherein the program instructions to receive the packet at the virtual switch direct the processing circuitry to receive the packet from a physical network interface of a host computing system for the virtual switch.

20. The apparatus of claim 17 wherein the program instructions to assign the one or more virtual ports to capture the packets associated with the first packet attributes direct the processing circuitry to assign the one or more virtual ports to capture the packets associated with the first packet attributes, wherein packets received by at least one of the one or more virtual ports are displayed on a console.

* * * * *